Figure 1:
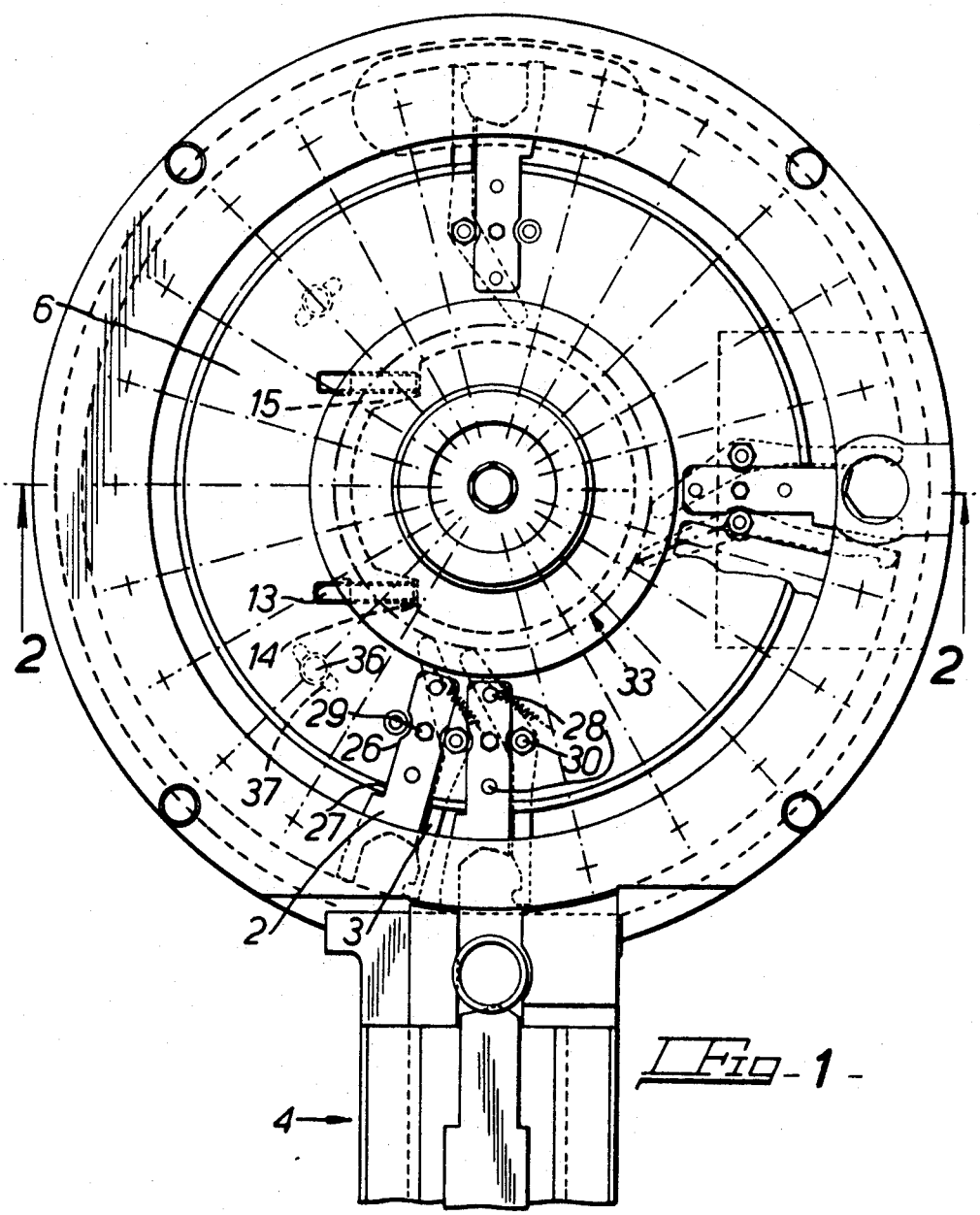

United States Patent [11] 3,624,708

| [72] | Inventor | Barry Anthony Richardson<br>Coventry, England |
|---|---|---|
| [21] | Appl. No. | 862,816 |
| [22] | Filed | Oct. 1, 1969 |
| [45] | Patented | Nov. 30, 1971 |
| [73] | Assignee | Wickman Machine Tool Sales Limited<br>Coventry, England |
| [32] | Priority | Oct. 2, 1968 |
| [33] | | Great Britain |
| [31] | | 46,760/68 |

[54] HANDLING WORKPIECES
18 Claims, 5 Drawing Figs.

[52] U.S. Cl............................................. 72/424,
198/33
[51] Int. Cl....................................... B21d43/20,
B65g 47/24
[50] Field of Search........................... 198/33 AB,
107; 221/156, 173

[56] References Cited
UNITED STATES PATENTS
2,689,057 9/1954 Kantor......................... 198/33 AB

*Primary Examiner*—Edward A. Sroka
*Attorney*—Scrivener, Parker, Scrivener and Clarke ABSTRACT: A feeding device comprising a carrier which is to be loaded with a workpiece and which has a fixed arm and a movable arm, the movable arm being provided with means to urge it towards the fixed arm and a notch being formed between the two arms to receive the workpiece in a particular orientation, and a loading device being provided to load the workpiece into the notch in this particular orientation. The loading device preferably comprises a pusher member which is movable towards the opening of the notch and a guide member which is movable along a line transverse to the direction of movement of the pusher member in the plane of the notch, the guide member being displaced by the workpiece as it is pushed into the notch and in turn acting to press the workpieces against a fixed shoulder. Where the feeding device is to handle regular-polygonal blanks the guide shoulder is preferably straight, and edges at the ends of the pusher member, the guide member and the movable arm are inclined to the guide shoulder so as to engage sides of each blank and to orientate the blank by urging one side against the guide shoulder as it is loaded into the notch. This carrier may possess several notches and may move relative to the loading device to align each notch in turn with the loading device so that it can be loaded. The carrier may be in the form of a rotary, index plate assembly in use in a coining press.

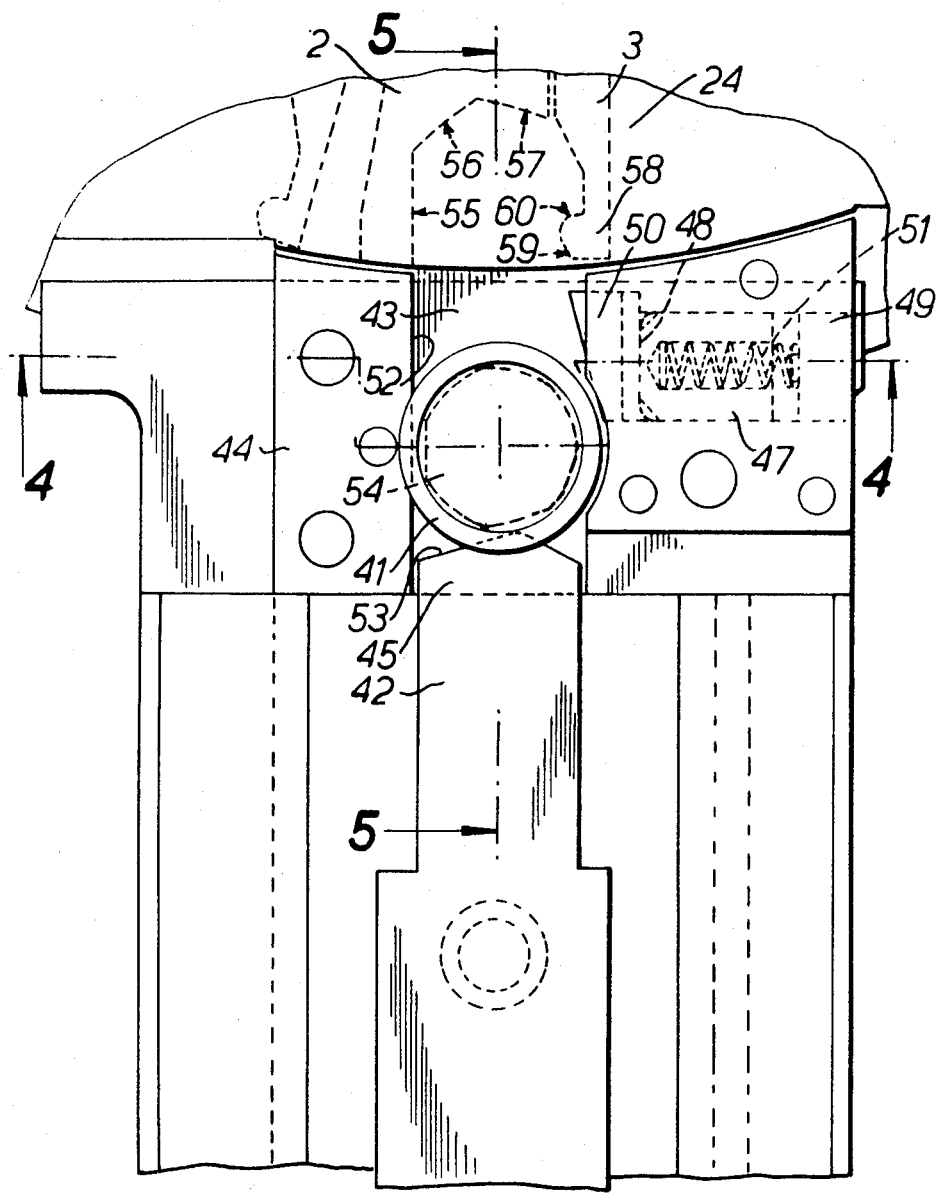

HANDLING WORKPIECES

This invention relates to means for the handling of workpieces of a regular polygonal shape so that they are orientated correctly. Such devices are of use in a number of applications where a side of the workpiece has to be aligned to allow a particular operation to be performed on a side or face of the workpiece. In particular, however, this invention relates to a device for automatically feeding aligned polygonal blanks to a coining press.

Coining presses are known for handling circular blanks in which the blanks are fed to the press by being loaded into notches in the outer edge of a circular index plate, this plate indexing round to bring the blanks between a pair of dies which stamp them, the blanks then being carried in the notches to an unloading station. In these feeding devices the notches are U-shaped having a semicircular inner edge to receive and locate the blanks. The blanks themselves do not have to be specially orientated in the notches. This is not the case, however, with noncircular blanks such as those required for the new seven-sided coins to be introduced with decimal coinage in the United Kingdom. These blanks must be fed into the notches so that they are all received and held therein in a particular orientation so as to coincide with the dies and be stamped correctly. Furthermore, while the notches must be such as to hold the blanks in this fixed orientation, they must also be such as to receive and hold the blanks after they have been stamped when they are slightly increased in size. An object of the present invention is to provide an automatic feeding device suitable for use with such coining presses and which will give these desired results.

The present invention consists in an orientating device comprising a carrier which is to be loaded with a workpiece and which has a notch shaped to receive the workpiece in a particular orientation, the notch being partly formed by a fixed arm and partly by a movable arm which is urged towards the fixed arm, a loading device being provided to load the workpiece into the notch in the required orientation.

According to a further feature of the invention the loading device comprises a pusher member and a guide member, the pusher member moving along the axis of the notch towards the notch opening and the guide member moving along a line transverse to the axis of the notch and in the plane of the notch, the guide member being displaced against spring pressure or equivalent pressure by the workpiece as it is pushed into the notch and in turn acting to press the workpiece against a fixed guide shoulder, the guide members, pusher member and free end of the movable arm being shaped so as to hold the workpiece in a fixed orientation as it is pushed into the notch, the notch in the fixed arm being shaped to receive the workpiece in this orientation and the movable arm further serving to engage and retain the workpiece in the notch in this orientation after being displaced by the workpiece as it is pushed into the notch.

According to a further feature of the invention, the carrier which is to be loaded with a workpiece may possess several notches to be loaded, this carrier moving relative to the loading device so as to align each notch in turn with the device. Such a carrier may comprise a continuous chain formed from a plurality of members each possessing a notch, or an index plate as used in the coining press described above.

The invention will now be described, by way of example, with reference to the accompanying drawings where it is used in a coining press in which it feeds regular seven-sided blanks to the dies of the press so that they are correctly orientated.

Figure 2:
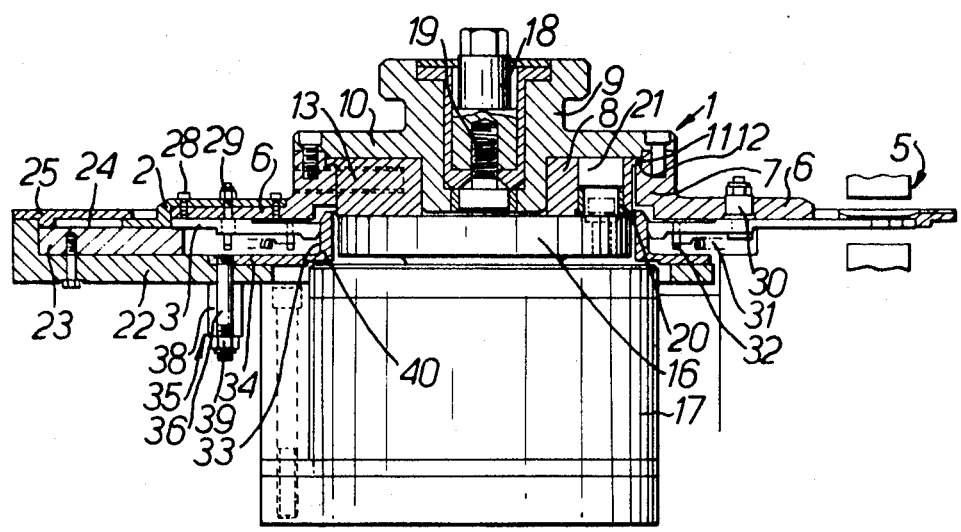
Figure 4:
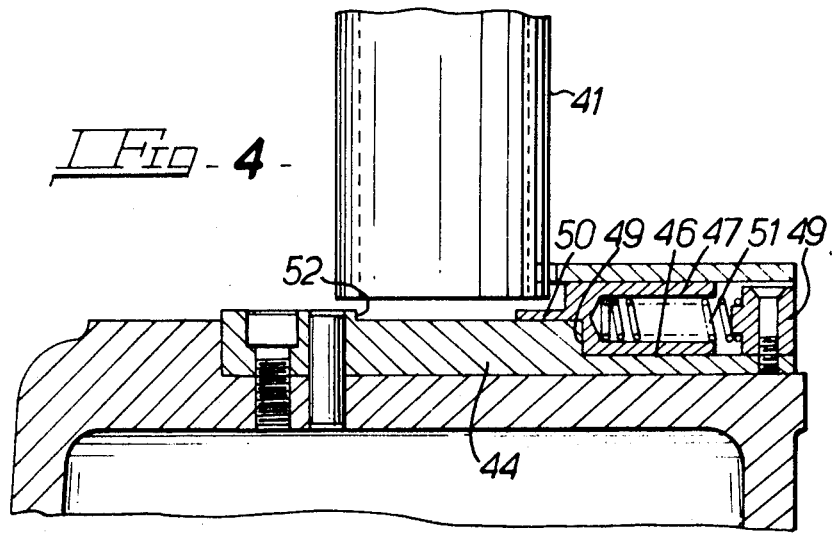
Figure 5:
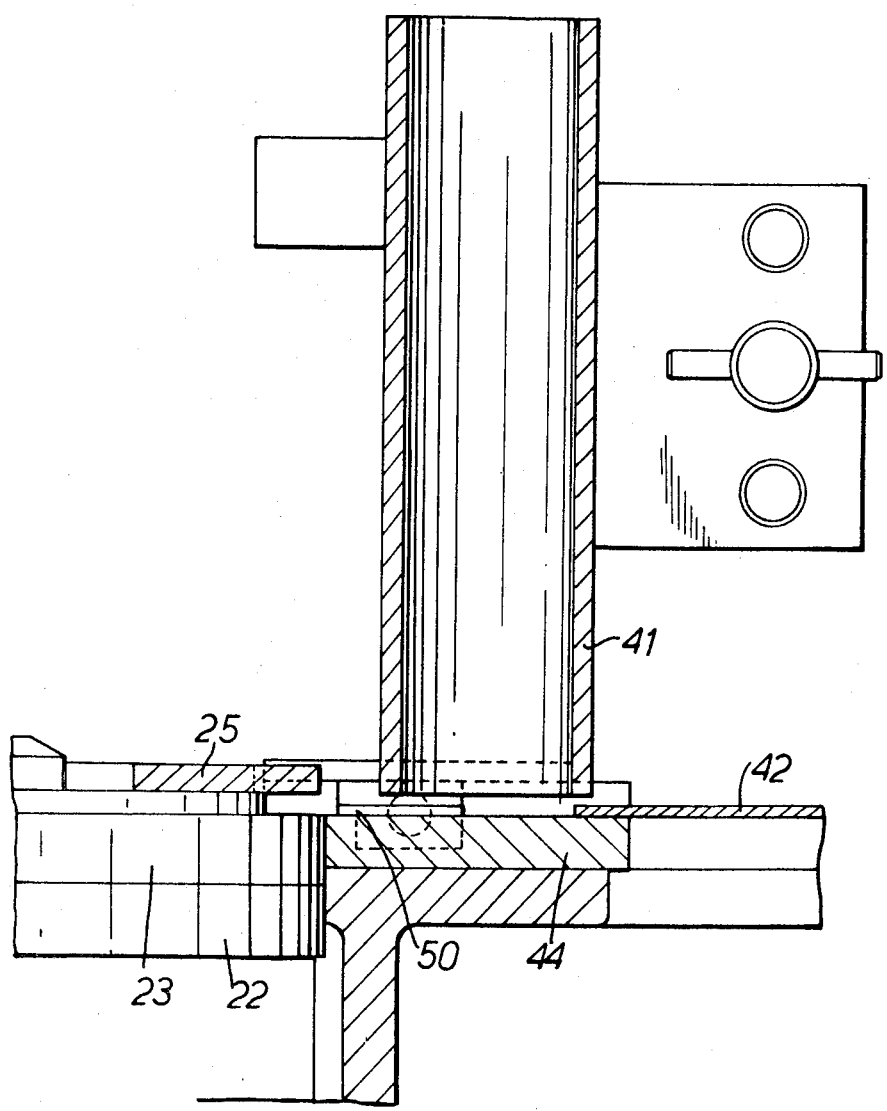

FIG. 1 shows a simplified plan view of the coiner and loading device in the press, FIG. 2 shows a side elevational view along the line 2—2 of FIG. 1, FIG. 3 shows a more detailed plan view of the loading device of FIG. 1, FIG. 4 shows a cross-sectional view along the line 4—4 in FIG. 3, and FIG. 5 shows a cross-sectional view along the line 5—5 in FIG. 3.

The carrier comprises a rotary index plate assembly 1 which rotates about a vertical axis and which has 24, equispaced pairs of radially directed arms 2 and 3 around its periphery, each such pair of arms defining between them a notch which opens outwards away from the axis of rotation of the index plate assembly and which plate assembly and which is shaped to receive a blank in a horizontal plane. When the press is in operation the index plate assembly 1 is indexed through 24 successive positions in time with the operating cycle of the press so as to move each notch in turn from a loading station, on to a coining station and then an unloading station, and finally back to the loading station. During each interval when the index plate is stationary, a blank is loaded into one notch by a loading device 4 at the loading station, a blank which has previously been loaded into a notch is coined between opposing dies 5 of the press at the coining station, and a coined blank is removed from a notch at the unloading station. The loading and unloading stations are disposed at diametrically opposed points at the periphery of the index plate assembly 1, and the coining station is midway between the other two stations.

The index plate assembly, as best seen in FIG. 1, comprises an annular plate 6 which extends radially of the axis of the whole assembly and which is formed with a sleeve 7 at its inner edge by which it is connected to a central hub formed by an inner member 9 and an outer annular member 8. These members 8 and 9 are a close fit with one another and are capable of rotary movement with respect to one another about the vertical axis of the index plate assembly. The member 9 is formed with an annular flange 10 and the upper end of the sleeve 7 of the plate 6 is connected to this flange at its periphery. The member 8 is disposed beneath the flange within the sleeve 7 and is held in place by a radial lip 11 which is formed on it and is located between a step 12 in the upper end of the sleeve 7, and the underside of the flange 10. The sleeve 7 of the plate 6 and the member 8 are keyed together by two screws 13 which are threaded in the sleeve 7 and which, at their inner ends, engage flattened surfaces 14 in recesses 15 in the side of the member 8. The angular position of the plate 6 relative to the member 8 can be adjusted using the screws 13.

This whole index plate assembly 1 is connected to a drive table 16 which is mounted in bearings in a fixed housing 17 and is rotated by the drive means of the press. The connection between the assembly 1 and the table 16 is achieved by a nut 18 which is captive in the member 9 of the central hub and which engages a threaded spigot 19 on the table 16. A peg 20 on the table 16 engages in a bore 21 in the member 8 and serves to key the table 16 and the index plate 1 together. An advantage of this construction is that it is a relatively simple operation to replace the index plate assembly with another such assembly having pairs of arms 2 and 3 at its periphery which are suitable for different shaped blanks.

An annular base member 22 is provided beneath the index plate assembly 1. This member is fixed and supports an annular member 23 made of nylon or similar material and which extends around the periphery of the index plate assembly beneath the arms 2 and 3, so as to form a supporting surface 24 on which the blanks can slide as the index plate assembly rotates. A further annular member 25 is supported at the periphery of the base member 22 to overlie the members 22 and 23, and the notches in the ends of the arms 2 and 3, so as to define an annular space between it and the member 23 in which the blanks are confined to move. Portions of the members 22, 23 and 25 are removed in the region of the loading, coining and unloading stations so as to allow the appropriate operations to be performed on the blanks.

The pairs of arms at the periphery of the index plate assembly each comprise a fixed arm 2 and a movable arm 3. The fixed arm 2 is mounted in a recess 26 in the top surface of the annular plate 6 and is cranked downwards through a notch 27 in the edge of the plate 6 so that the outer end of the arm extends substantially radially below the plate 6 and into the annular space between the members 23 and 25. Two screws 28 and a pin 29 serve to connect the arm 2 to the plate 6.

The movable arm 3 is mounted beneath the plate 6 and comprises a two-armed lever which is pivotally connected at its center to the plate 6 by a pin 30 alongside the pin 29. The portion of the pin 30 on which the arm 3 is journaled is eccentric about the axis of the pin so that the actual pivotal axis of the arm 3 can be adjusted by rotating the pin 30. The outer end of the arm 3 runs alongside the fixed arm 2 on that side of the arm 2 which is in the direction of rotation of the index plate assembly relative to the fixed arm. The inner end of the arm 3 is directed at an angle to the outer end and lies partly beneath the inner end of the fixed arm 2. A coil spring 31 is connected between a pin 32 at the inner end of the arm 3 and the pin 29 of the next fixed arm 2 in the direction of rotation of the index plate assembly, so that the outer end of the arm 3 is urged towards the outer end of the arm 2.

The outer ends of the arms 2 and 3 are shaped, as described below, to form a notch to receive a regular seven-sided blank in a particular orientation. The inner end of the movable arm 3 is shaped to serve as a cam follower, this end being urged by the spring towards engagement with a cam surface 33 on an annular cam member 34. The cam surface is designed so that the spring 31 can act on the arm 3 at the loading station to urge the outer ends of the arms 2 and 3 together to grip a blank between them, and so that as the arms reach the coining station the arm 3 is pivoted by the cam 33 and the outer ends of the arms are held apart to release the blank. The blank is coined and returned to the arms and is carried on to the unloading station with the outer ends of the arms still held apart. Between the unloading station and the loading station the cam surface 33 allows the arm 3 to pivot so that the outer ends of the arms move together ready to grip a blank again. The cam member 34 is connected to the inner edge of the annular base member 22 by clamping means 35 each comprising a bolt 36 which extends through the cam member 34 and an elongated slot 37 in the member 22, and which carries a spacing collar 38 and a nut 39 at its free end. The elongated slots 37 in the member 22 allow angular adjustment of the cam member 34 relative to the base member 22. The cam surface 33 is provided on an upstanding portion 40 the cam member 34 at its inner edge.

The loading device 4 for loading a blank into each notch at the loading station is shown in FIGS. 3 to 5. The blanks are stored in a vertically disposed stacker tube 41 and are transferred, one at a time by a pusher member 42, from the bottom of the stacker tube to the notches between the arms 2 and 3, as each notch becomes aligned with the bottom of the stacker tube. The bottom of the stacker tube is positioned above a straight-sided channel 43 in a mounted base member 44, this channel being aligned radially with the index plate assembly 1, and the base of the channel 43 lying in substantially the same horizontal plane as the top surface 24 of the member 23 on which the loaded blanks are supported. The base of the channel 43 and the surface 24 of the member 23 together form a substantially continuous surface on which the blanks slide as they are each transferred from the bottom of the stacker tube 41 to the notch aligned with the channel 43. The pusher member 42 slides in the channel 43 and its free end 45 engages an edge of the lowermost blank to push it into the aligned notch. The bottom of the stacker tube is spaced at a distance above the channel, corresponding to the thickness of a blank, so that only the lowermost blank falls free of the stacker tube so as to be engaged by the pusher member 42 and loaded into a notch.

A further channel 46 is provided in the base member 44 to receive a guide member 47 and to allow it to slide in a horizontal plane along a line substantially perpendicular to the radial axis of the channel 43. The body of the guide member 47 is limited to movement between a shoulder 48 and a stop 49 in the channel 46, but a finger portion 50 at the end of the guide member nearest the channel 43 extends beyond the stop 49 into the channel 43 at a point between the bottom of the stacker tube and the aligned notch. A coil spring 51 is provided to act between the other end of the guide member and the stop 49 so as to urge the guide member 47 towards its extreme position in which the finger portion 50 projects into the channel 43. The end of the finger portion 50 is shaped so that it is engaged by an edge of each blank as it is moved by the pusher member into the aligned notch, and so that the guide member 47 is displaced against the action of the coil spring 51 which in turn acts on the blank to urge it against the side wall 52 of the channel 43 opposite the end of the finger portion 50. This sidewall 52 is straight and serves with the shaped end 50 of the guide member and the free end 45 of the pusher member 42 to correctly orientate each blank as it is loaded into the notch.

A correctly orientated blank 54 which is about to be loaded into a notch is shown in FIG. 3. The blank has slightly convexly curved sides. One of the seven sides of the blank is aligned substantially parallel to the sidewall 52 of the channel 43 and the adjacent side of the blank nearest the pusher member 42 is disposed in an acute angle between the sidewall 52 and an inclined edge 53 of the free end 45 of the pusher member. The next side around the blank is substantially parallel with the said inclined edge 53 of the pusher member and a part of this side is engaged by the inclined edge 53 as the pusher member 42 operates to load the blank into a notch. In doing this the pusher member 42 moves the blank towards the notch and also because of the acute angle between the end of the pusher member and the sidewall, urges the blank against the sidewall 52 to hold the said side of the blank which is substantially parallel with this wall into contact with it. The guide member 47 also urges the corresponding sides of the blank against the sidewall 52 and the inclined edge 53 but the guide member is not shaped to engage a side of the blank, but instead is inclined to the radial axis of the channel 43 so as to face the blank and to engage it at a corner. As the blank is moved by the pusher member 42 therefore, one side of the blank is held in contact with the sidewall 52 and the blank is loaded into the notch in this orientation. If the blank is not correctly orientated as it falls from the stacker tube it is orientated to the correct position by the shaped ends of the pusher and guide members as the pusher member moves the blank along the channel 43.

The notch formed between each pair of arms is shaped to receive a blank in the above described orientation. The two arms are aligned with the channel 43 and with the fixed arm 2 farthest from the guide member. One side of the notch in the fixed arm 2 is formed by a straight edge 55 of the arm which is aligned with the sidewall 52 and serves an an extension of that wall to engage along that side of the blank which is held in contact with the sidewall 52. Two other slightly curved edges 56 and 57 form the rest of the notch in the fixed arm, these other edges being angled to the edge 55 so that all three edges of the notch in the fixed arm engage along three adjacent sides of the blank.

The pivoted arm 3 has two shaped surfaces which engage the blank, both being formed around the inner edge of an enlarged portion 58 at the outer free end of the arm 3. One of these is a plane angled surface 59 which when the pivoted arm is in position to be loaded with a blank at the loading station is aligned to engage along a side of the blank as it is inserted into the notch. Engagement between this surface 59 and the side of the blank causes displacement of the pivoted arm 3 which then acts on the blank to help hold it against the sidewall 52 and the opposite side of the notch in the fixed arm 15. The second of these surfaces 60 is convex and faces inwards of the notch. This surface 60 bears against an outward facing side of the blank once it is inserted into the notch and serves to retain the blank in the notch. Thus the notch is shaped to hold a regular, seven-sided blank in a particular orientation but the notch is not itself of a fixed size and can still receive and if necessary hold the blank when it is expanded in its radial dimensions after being coined at the coining station.

I claim:

1. A feeding device comprising a carrier which is to be loaded with a workpiece of a substantially polygonal shape and which has a fixed arm and a movable arm which between them define a notch that is shaped to receive the workpiece when the latter is in a predetermined orientation, said movable arm being urged towards said fixed arm to grip and hold the workpiece when received in said notch, and a loading device to orientate the workpiece into the required orientation and to load it into said notch comprising a pusher member which is movable towards the opening of said notch, a supporting surface on which the workpiece slides in being loaded into said notch by said pusher member, and guide means which engage sides of the workpiece to orientate it in the plane of said supporting surface as it slides towards said notch.

2. A coining press provided with a feeding device as claimed in claim 1 so as to handle blanks and to feed these between the dies of the press in a particular orientation ready to be coined.

3. A device as claimed in claim 1 in which said guide means comprises the end of said pusher member which engages the blank, and the free end of said movable arm, the ends of these members being shaped to help turn the workpiece to the required orientation and to hold it in this orientation as it is pushed into said notch.

4. A device as claimed in claim 3 in which said guide means further comprises a fixed guide shoulder, and in which said end of the pusher member which engages the workpiece is inclined at an acute angle to the guide shoulder so that both said guide shoulder and the inclined end of the pusher member can each engage along different sides of the workpiece, these members serving to orientate the workpiece to engage it in this way as the pusher member pushes the workpiece into said notch.

5. A device as claimed in claim 1 in which said guide means comprises a guide member which is movable along a line transverse to the direction of movement of said pusher member and substantially in the plane of said supporting surface, and a fixed guide shoulder, said guide member being displaced by the workpiece as it is pushed into said notch and in turn acting to press the workpiece against said guide shoulder, said guide member and guide should being shaped so as to turn the workpiece to the required orientation and hold it in this orientation as it is pushed into the notch.

6. A device as claimed in claim 5 in which said guide means further comprises the end of said pusher member which engages the blank, and the free end of said movable arm the ends of these members being shaped to help turn the workpiece to the required orientation and to hold it in this orientation as it is pushed into said notch.

7. A device as claimed in claim 6 for handling workpieces of a regular polygonal shape in which said fixed guide shoulder is straight and said end of the pusher member which engages the workpiece is inclined at an acute angle to said guide shoulder so that both the guide shoulder and the inclined end of the pusher member can each engage along different sides of the workpiece, these members serving to orientate the workpiece to engage it in this way as the pusher member pushes the workpiece into said notch.

8. A device as claimed in claim 7 in which the end of the guide member which engages the workpiece is inclined to the guide shoulder so as to face the workpiece when the workpiece is in position to be engaged by the pusher member, the guide member serving to urge the workpiece into engagement with both the guide shoulder and the pusher member.

9. A device as claimed in claim 8 in which the movable arm is on the side nearest the guide member and the side of the notch in the fixed arm is a straight edge which is aligned with the guide shoulder when the blank is loaded into the notch.

10. A device as claimed in claim 9 in which the part of the notch in the fixed arm is shaped to engage the sides around substantially one quarter of the workpiece.

11. A device as claimed in claim 10 in which the movable arm has a straight edge at its free end which is inclined to the guide shoulder so as to face it at an angle and so as to engage along a side of the workpiece as the correctly orientated workpiece is loaded into the notch.

12. A device as claimed in claim 11 which the movable arm has a convexly curved portion at its free end which faces inwards of the notch and which engages a side of the workpiece to retain the loaded workpiece in the notch.

13. A device as claimed in claim 1 in which the carrier has a plurality of pairs of arms each with a notch defined between them and in which the carrier is movable relative to the loading device to align successive notches one at a time with the loading device.

14. A device as claimed in claim 13 in which the carrier comprises a rotary index plate assembly which carries the pairs of arms around its periphery.

15. A device as claimed in claim 14 in which an annular member is provided beneath and around the periphery of the index plate assembly so as to provide a surface just beneath the notches on which the loaded workpieces can slide as they are carried in the notches by the index plate assembly, this surface being in the same plane as the plane of the supporting surface.

16. A device as claimed in claim 15 in which the movable arm is pivotally mounted on the rotary index plate assembly.

17. A device as claimed in claim 16 in which the arm is in the form of a two armed-lever and in which the outermost end of this arm is urged towards the fixed arm, thus causing the innermost end of this movable arm to be urged towards engagement with a stationary, annular cam surface, this cam surface being shaped so as to periodically activate the movable arm and cause the outer end of the movable arm to move away from the outer end of the fixed arm so as to release a workpiece from the notch between these outer ends of the arms.

18. A device as claimed in claim 17 in which the index plate assembly rotates about a vertical axis and in which the movable arm and the cam surface are provided beneath the index plate assembly.

* * * * *